(12) United States Patent
Chao et al.

(10) Patent No.: US 7,293,978 B2
(45) Date of Patent: Nov. 13, 2007

(54) DEVICE FOR FORMING HIGH PRECISION OPTICAL LENS AND THE PRODUCT MADE BY THE DEVICE

(75) Inventors: Sheng-Jui Chao, Taichung (TW); Yung-I Chang, Taichung (TW)

(73) Assignee: Asia Optical Co., Ltd., Taichung (TW)

( * ) Notice: Subject to any disclaimer, the term of this patent is extended or adjusted under 35 U.S.C. 154(b) by 370 days.

(21) Appl. No.: 10/853,216

(22) Filed: May 26, 2004

(65) Prior Publication Data
US 2005/0105190 A1 May 19, 2005

(30) Foreign Application Priority Data
Nov. 18, 2003 (TW) ............... 92132247 A

(51) Int. Cl.
*B29D 11/00* (2006.01)
*B29C 45/40* (2006.01)

(52) U.S. Cl. .................................. 425/444; 425/808

(58) Field of Classification Search ............... 425/556, 425/444, 808; 264/1.1
See application file for complete search history.

(56) References Cited

U.S. PATENT DOCUMENTS

| | | | |
|---|---|---|---|
| 2,834,989 A * | 5/1958 | Kusnery .................. 249/68 |
| 5,413,743 A * | 5/1995 | Prophet .................. 264/1.7 |
| 5,644,833 A * | 7/1997 | Starkey .................. 29/527.2 |
| 6,638,054 B2 * | 10/2003 | Yamashita et al. .......... 425/556 |
| 6,872,069 B2 * | 3/2005 | Starkey .................. 425/556 |
| 2002/0078776 A1 * | 6/2002 | Yamashita et al. ............ 74/425 |

FOREIGN PATENT DOCUMENTS

| | | |
|---|---|---|
| CN | 97207324.8 | 3/1997 |
| CN | 02262936.X | 7/2002 |
| JP | 59-158231 * | 9/1984 |

OTHER PUBLICATIONS

English abstracts for JP 59-158231.*
English abstracts for JP 59-158231, dated Sep. 1984.*

* cited by examiner

*Primary Examiner*—Robert B. Davis
(74) *Attorney, Agent, or Firm*—Sughrue Mion Pllc.

(57) ABSTRACT

A high precision molding device for insert-molding optical lens comprises a stationary sub-mould and a movable sub-mould for engaging with the stationary sub-mould thereby forming a mould cavity therebetween for molding an optical lens. The molded lens has a body and a protection ring extending outside from the body, and is separated from the stationary sub-mould together with the movable sub-mould. The movable sub-mould includes a mould base, a core fixed with the mould base and a pushing means for pushing the molded lens off the movable sub-mould. The pushing means is circumferentially positioned at the mould base. The upper and bottom surfaces of the protection ring of the molded lens form textures to be foggy.

5 Claims, 3 Drawing Sheets

DEVICE FOR FORMING HIGH PRECISION OPTICAL LENS AND THE PRODUCT MADE BY THE DEVICE

TECHNICAL FIELD

The present invention relates to a device for molding high precision optical lens and the product made by the device, especially to a molding device, which can ensure the high precision of the produced optical lens and the precise collimation of corresponding lens assembly, and the corresponding high precision optical lens produced by the molding device.

DESCRIPTION OF RELATED ARTS

Nowadays, optical lens are commonly produced in two ways including cutting and molding by corresponding cutting equipments and molding equipments respectively. Relevant prior arts can refer to a Chinese patent ZL02262936.X which discloses a synchronous molding working table for forming eyeglasses. The working table comprises a substrate, a central shaft, a first base, a second base, a connecting shaft and a handle. The second base is positioned just under a cutter set and has a spherical substrate having a wind suction opening for sucking a material plate placed thereon. The working table of this patent is essentially a kind of cutting equipment for making spherical eyeglasses.

Another published U.S. Pat. No. 6,723,260 then gives an equipment for insert-molding optical lens. The patent application involves a molding device and an according manufacture system for producing plastic lens. The lens molding device includes a first lens solidification unit, a second lens solidification unit and a transporting system for transporting mould assemblies between the first and second lens solidification units. The lens molding device may further comprise an annealing unit which is used for heating lens which is basically polymerized and making eyeglasses from according raw materials thereof.

Another method and according manufacturing equipment for molding contact type lens are disclosed in an U.S. Pat. No. 5,524,419 as published. The method comprises the steps of: forming front and rear mould cavities in a first and second roll sheets respectively; filling raw material liquid, which may be solidified into lens, into the front mould cavities; assembling the front and rear mould cavities so as to engage them with each other with center axes thereof collimating with each other; solidifying the raw material liquid in the front and rear mould cavities; and separating the front and rear mould cavities and then taking the molded lens therefrom.

Another kind of relevant prior art can be referred to what is published in a Chinese patent ZL97207324.8. The device as described in the patent is essentially an extrusion substrate for forming soft plastic wide-angle lens. The extrusion substrate includes a base plate and annular tooth rings, and the feature thereof is that a few blocking slots are formed around the extrusion substrate.

As far as the molding equipments for insert molding optical lens are concerned, corresponding moulds should be carefully designed so as to ensure the preset precision of the molded optical lens made therefrom. For example, U.S. Pat. No. 5,441,398 (hereinafter referred to as '398) and U.S. Pat. No. 6,165,392 (hereinafter referred to as '392) both give detailed designs of insert molding moulds for optical lens. These two patents are respectively assigned to Gentex Optics, Inc. and Yamamoto Kogaku Kabushiki Kaisha, and adopt similar design concepts which are realized in different ways.

An additional insert as disclosed in '398 is positioned in the mould cavity of a sub-mould for forming the convex surface of a molded lens thereof. The additional insert has a shoulder formed around its periphery for engaging with the sub-mould thereby achieving the position of the additional insert in the mould cavity thereof.

While what '392 discloses is distinct from the idea of '398. '392 also uses a similar additional insert which has no such a shoulder around its periphery. Instead, a plurality of sucking apertures are formed in the sub-mould onto which the additional insert is attached. A bump can exert suction force upon the additional insert via a slot communicating with the sucking apertures of the sub-mould. Hence, the additional insert can then be positioned.

As we all know, conventionally an insert-molding device 1 (referring to FIG. 1) for molding optical lens normally includes a stationary sub-mould 10 and a movable sub-mould 15. When the movable sub-mould 15 is engaged with the stationary sub-mould 10, a mould cavity 14 with a specific configuration is thus formed therebetween. Melton raw material liquid for making lens is then put into the mould cavity 14 and is kept therein for a certain time under proper conditions (e.g., under specific pressure and temperature, etc.). Then, after the molded lens 18 in the mould cavity 14 is cooled down to the room temperature, the stationary sub-mould 10 and the movable sub-mould 15 are separated. The molded lens 18 will be left on the stationary sub-mould 10, and then be separated from the stationary sub-mould 10.

In FIG. 1, the molded lens 18 is moved together with the movable sub-mould 15 away from the stationary sub-mould 10. The following process is to separate the molded lens 18 from the movable sub-mould 15. The movable sub-mould 15 normally has a fixed base 16 and a movable core 17. When the lens 18 is separated from the movable sub-mould 15, the fixed base 16 is unmoved while the movable core 17 is pushed by a pushing shaft 19 to detrude the molded lens 18 away from the movable sub-mould 15.

However, since the core 17 is movable relative to the fixed base 16, a space is inevitably existed therebetween. Therefore, in the course of insert-molding, burrs (not shown) will be unavoidably produced at a position of the lens 18 corresponding to the space between the core 17 and the fixed base 16. The size or volume of the burrs will be determined by the size of the space therebetween. The burrs then will complicate the further process of the molded lens 18 which will thus result in increased costs thereof.

Moreover, due to the existence of the space between the core 17 and the fixed base 16, during the course that the pushing shaft 19 pushes the core 17 outside so as to detrude the lens 18, the core 17 might become tilted relative to the fixed base 16. The possible tilt of the core 17 will adversely affect the molded lens 18, which may results in that the molded lens 18 is eccentric and further affects the optical path of a light beam. That is to say, a light beam would not strictly proceed along the pre-determined trace after it penetrates the lens 18 as molded in the above-described way. Although the space between the core 17 and the fixed base 16 is not big and the mentioned eccentricity is also not big, as far as a high precision optical lens is concerned, any possible error which might adversely affect the precision thereof is not acceptable and should be avoided as much as possible.

If the molded lens 18 is applied to make optical lens assemblies of some precise optical devices such as a camera, when a few of the molded lens 18 respectively with such a eccentric flaw are overlapped together in assembly, the optical axes of each molded lens 18 are not co-axial and the assembly can not ensure the high precision.

In addition, an optical lens as molded in the above way normally forms a protection ring around the periphery thereof. The protection ring extends outside from the body of the molded lens and has a certain height. When two such lenses are overlapped together, the protection ring may protect the overlapped lens and in the meantime, the height of the protection ring also determine the distance between the two lenses. The precision of the distance is very important to the lens assembly and may directly affect the image quality of the whole lens assembly. On the other hand, as the protection ring is made of the same material with that of the lens body, lights may then penetrate therefrom as well. Hence, the lights which go through the protection ring are apt to interfere those coming through the lens body and such phenomena is not desired.

SUMMARY OF THE INVENTION

A main object of the present invention is to provide a device for molding high precision optical lens and the lens made by the device, the lens molded by the device not only overcomes the eccentricity problem thereof as above discussed, but also ensures the high precision of the molded lens and precise alignment between overlapped lens after they are assembled together.

A second object of the present invention is to provide a device for insert-molding high precision optical lens and the lens made by the device, the lens as molded by the device not only has high precision, but also is smooth and has few burrs or even no burrs thereon, thereby simplifying the following further process thereof and decreasing the manufacturing costs thereof.

A third object of the present invention is to provide a device for molding high precision optical lens and the lens molded by the device, the molded lens is properly oxidized whereby no such interference problem as above mentioned exists.

In order to achieve the objects set forth, a high precision molding device for insert-molding optical lens is provided in accordance with the present invention. The molding device comprises a stationary sub-mould and a movable sub-mould for engaging with the stationary sub-mould thereby forming a mould cavity therebetween for molding an optical lens. The molded lens has a body and a protection ring extending outside from the body, and is separated from the stationary sub-mould together with the movable sub-mould.

The movable sub-mould includes a mould base, a core fixed with the mould base and a pushing means for pushing the molded lens off the movable sub-mould. The pushing means is located on the mould base, and to be more exact, the pushing means is circumferentially positioned at the mould base.

The pushing means may include a plurality of slots and a plurality of pushing shafts located within the slots. The positions of the pushing shafts are correspondent to the protection ring of the molded lens. The upper and bottom surfaces of the protection ring of the molded lens are oxidized to be foggy.

The pushing means may also include an annular slot and a pushing ring located within the annular slot of the mould base. The position of the pushing ring is corresponding to the protection ring of the molded lens. The upper and bottom surfaces of the protection ring of the molded lens form textures to be foggy.

Furthermore, when the movable sub-mould is separated from the stationary sub-mould, the molded lens of the present invention may either stay on the movable sub-mould or stay on the stationary sub-mould, which all depends on corresponding actual needs or requirements thereof. In the meantime, the pushing means is then positioned on the same sub-mould to which the molded lens is attached after the separation between the stationary sub-mould and the movable sub-mould.

Moreover, out of the stationary sub-mould and the movable sub-mould, at least the sub-mould to which the molded lens is attached has the mould base and the core. The pushing means is positioned in the mould base, and more preferably to be positioned circumferentially around the periphery of the mould base. Exactly, the position of the pushing means is corresponding to the protection ring of the molded lens.

A high precision optical lens molded by the high precision molding device in accordance with the present invention has a body and a protection ring extending outside from the body. The position of the protection ring is faced with the pushing means as above-mentioned. The upper and bottom surfaces of the protection ring form textures to be foggy so as to diminish the interference affections to the lights penetrating the lens body by those penetrating the protection ring thereof.

Since the molding device in accordance with the present invention additionally has the pushing means, the mould base can be integrally fixed with the core. Therefore, no space is needed to be set between the mould base and the core, or the space therebetween could be set to be very small.

Thus, the molded lens can not only have high precision thereof, but also be smooth and have few burrs or even no burrs thereon, thereby simplifying the following further process thereof and decreasing the manufacturing costs thereof.

As the upper and bottom surfaces of the protection ring of the molded lens are properly foggy, no light could then penetrate the protection ring so as to adversely interfere the lights penetrating the body of the lens. Hence, the high precision of the molded lens can be further ensured accordingly.

Other objects, advantages and novel features of the invention will become more apparent from the following detailed description when taken in conjunction with the accompanying drawings.

DETAILED DESCRIPTION OF PREFERRED EMBODIMENT

Figure 1:
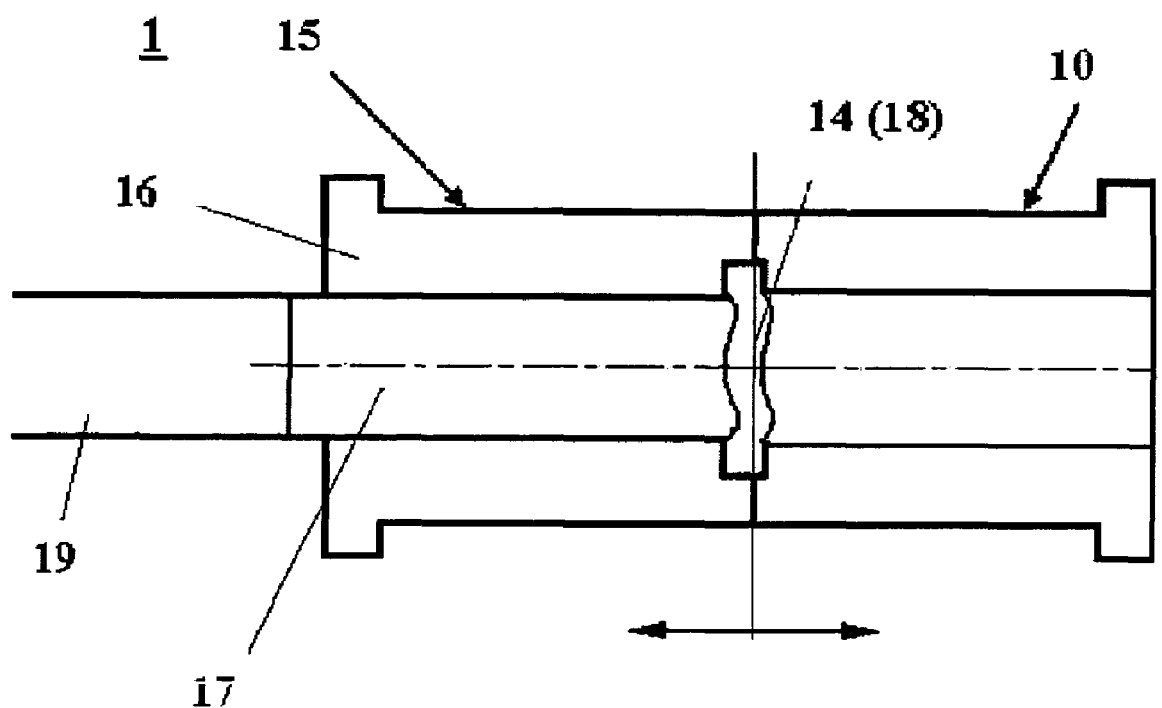
FIG. 1 is a sectional view of a prior art.
Figure 2:
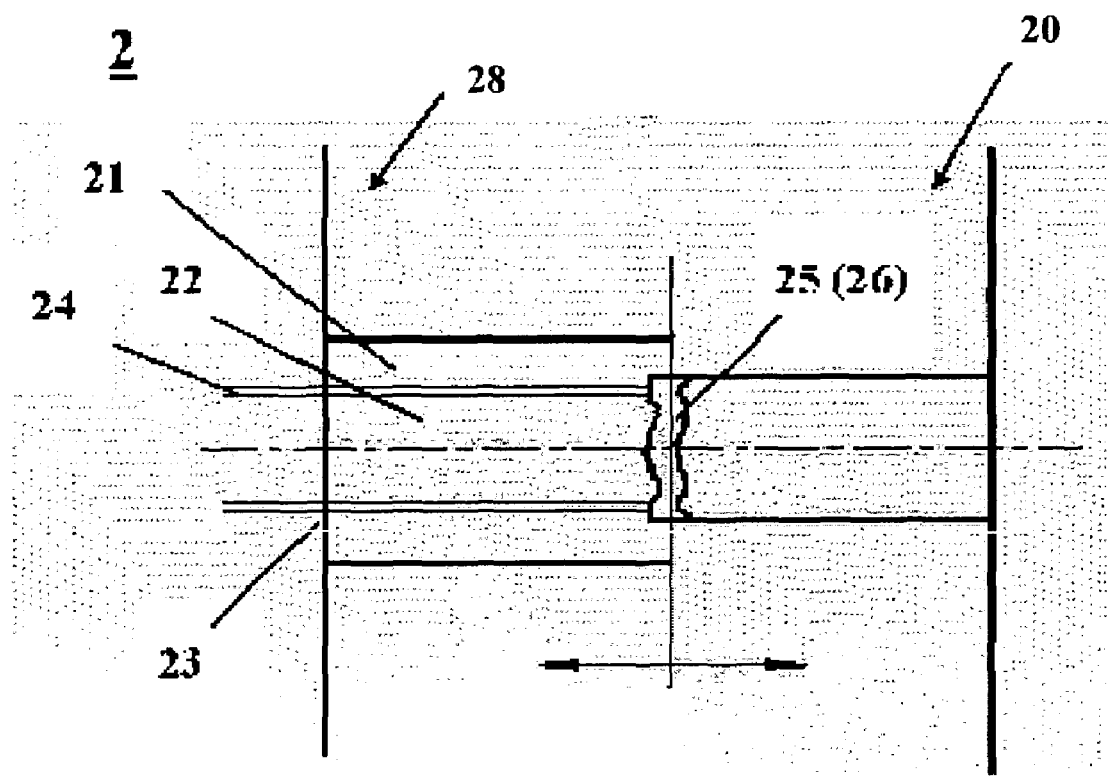
FIG. 2 is a sectional sketch view of the molding device in accordance with the present invention.

Referring to FIG. 2, a high precision molding device 2 for insert-molding optical lens is provided in accordance with the present invention. The molding device 2 comprises a first sub-mould 20 which may be stationary and a second sub-mould 28 which may be movable. The movable second sub-mould 28 engages with the stationary first sub-mould 20 thereby forming a mould cavity 25 therebetween for molding an optical lens 26.

The molded lens 26 has a body 260 and a protection ring 265 extending outside from the body 260. The molded lens 26 may either be separated from the stationary first sub-mould 20 together with the movable second sub-mould 28, or be separated from the movable second sub-mould 28 together with the stationary first sub-mould 20.

In the embodiment as shown in FIG. 2, the molded lens 26 stays on the movable second sub-mould 28 when the movable second sub-mould 28 is separated from the stationary sub-mould 20. The movable second sub-mould 28 includes a mould base 21 and a core 22 fixed with the mould base 21. The mould base 21 and the core 22 can be made of the same proper material or be made of different materials respectively. When the movable stationary sub-mould 20 is separated from the movable sub-mould 28, the core 22 doesn't move relative to the mould base 21. Hence, the space between the core 22 and the mould base 21 may be small as much as possible, or no space is existed between the core 22 and the mould base 21. For the latter option, the mould base 21 and the core 22 can be integrated together or integrally molded together.

The movable second sub-mould 28 may further include a pushing means for pushing the molded lens 26 off the movable second sub-mould 28. The pushing means is located on the mould base 21, and to be more exact, the pushing means is circumferentially positioned at the mould base 21.

Figure 3:
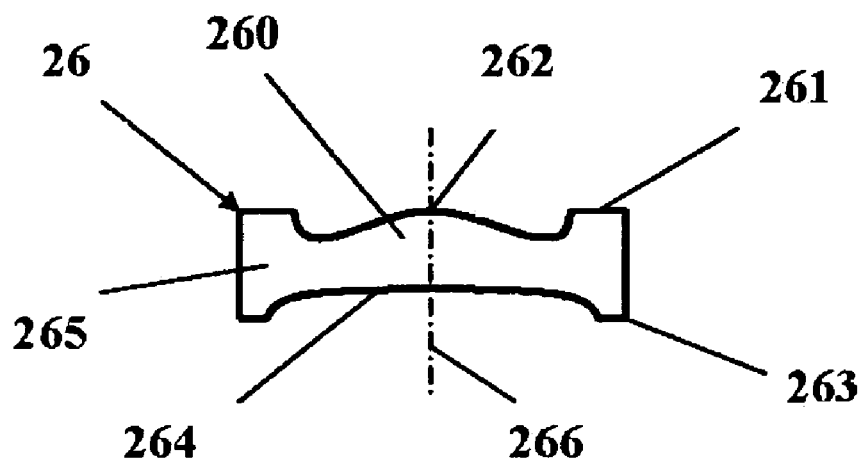
FIG. 3 is a view showing a lens molded by the molding device in accordance with the present invention.
Figure 4:
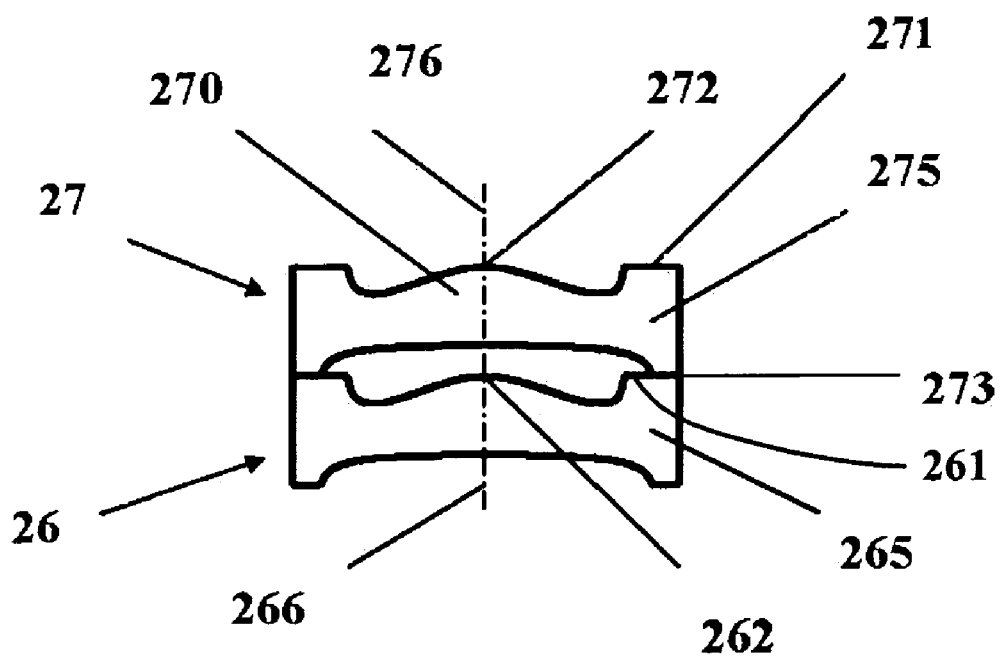
FIG. 4 is a view showing two overlapped lenses molded by the molding device in accordance with the present invention.

Further referring to FIGS. 3 and 4, the molded lens 26 has a lens body 260, a protection ring 265 around the body 260 and an optical axis 266 of the body 260. The lens body 260 may form a convex top point 262 which is located on the centre axis 266. The top point 262 and the optical axis 266 are both used for alignment when assembly.

The pushing means may include a plurality of slots 23 and a plurality of pushing shafts 24 located within the slots 23. The positions of the pushing shafts 24 are correspondent to the protection ring 265 of the molded lens 26. The upper and bottom surfaces 261, 263 of the molded lens 26 form textures to be foggy.

The pushing means may also include an annular slot 23, instead of the plurality of slots 23 as above-mentioned, and a pushing ring 24, instead of the above-pushing shafts 24, located within the annular slot 23 of the mould base 21. The position of the pushing ring 24 is also corresponding to the protection ring 265 of the molded lens 26. The upper and bottom surfaces 261, 263 of the protection ring 265 of the molded lens 26 form textures to be foggy as well.

The pushing means may not be located circumferentially on the mould base 21 of the sub-mould to which the molded lens 26 is attached as well, and other appropriate positions can also be set provide that the pushing shafts or the pushing ring 24 thereof face(s) the edge of the molded lens 26 (e.g., face the protection ring 265 of the molded lens 26), instead of the lens body 260 thereof. Only in this way, the precision of the molded lens 26 can be ensured to the maximal extend.

Furthermore, when the movable second sub-mould 28 is separated from the stationary first sub-mould 20, the molded lens 26 of the present invention may either stay on the movable sub-mould 28 or stay on the stationary sub-mould 20, which all depends on the corresponding actual needs or requirements thereof. In the meantime, the pushing means is then positioned on the same sub-mould 20 or 28 to which the molded lens 26 is attached after the separation between the stationary sub-mould 20 and the movable sub-mould 28.

Moreover, out of the stationary sub-mould 20 and the movable sub-mould 28, at least the sub-mould 20 or 28 to which the molded lens 26 is attached has the mould base and the core. The pushing means is positioned in the mould base 21 thereof, and more preferably to be positioned circumferentially around the periphery of the mould base 21 thereof. Exactly, the position of the pushing means is corresponding to the protection ring 265 of the molded lens 26.

Therefore, the high precision optical lens 26 as molded by the high precision molding device 2 in accordance with the present invention has a body 260 and a protection ring 265 extending outside from the body. The position of the protection ring 265 is faced with the pushing means as above-mentioned. The upper and bottom surfaces 261, 263 of the protection ring 265 form textures to be foggy so as to diminish the interference affections to the lights penetrating the lens body 260 by those penetrating the protection ring 265.

Referring back to FIGS. 3 and 4, the upper and bottom surfaces 261, 263 of the protection ring 265 of the molded lens 26 can be set to be higher or lower than the upper and bottom surfaces of the lens body 260. Preferably, the distance between the upper and bottom surfaces 261, 263 are larger than the corresponding distance of the upper and bottom surfaces of the lens body 260 thereby protecting the body 260 from possible damage.

FIG. 4 shows an assembly of two molded lenses 26 and 27 by the molding device 2 in accordance with the present invention. The lens 27 is overlapped over the lens 26 with the bottom surface 273 of the protection ring 275 of the lens 27 positioned on the upper surface 261 of the protection ring 265 of the lens 26. The convex top point 262 doesn't contact with the body 270 of the lens 27. The axis 276 of the lens 27 and the axis 266 of the lens 26 are coaxial so that the convex top point 272 of the lens 27 and the convex top point 262 of the lens 26 are located at the same line.

Thus, the two overlapped molded lens 26 and 27 are well aligned with each other and are ready for proper applications in correspondent optical devices such as a camera. Moreover, more molded lens 26 or 27 can also be assembled together in similar ways.

Since the molding device 2 in accordance with the present invention additionally has the pushing means, the mould base 21 thereof is integrally fixed with the core 22. Therefore, no space is needed to be set between the mould base 21 and the core 22, or the space therebetween could be set to be very small.

Thus, the molded lens 26 can not only have high precision thereof, but also be smooth and have few burrs or even no burrs, thereby simplifying the following further process thereof and decreasing the manufacturing costs thereof.

As the upper and bottom surfaces 261, 263 of the molded lens form textures, no light could then penetrate the protection ring 265 so as to adversely interfere the lights penetrating the body 260 of the lens 26. Hence, the high precision of the molded lens 26 can be further ensured accordingly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A molding device comprising a stationary sub-mould and a movable sub-mould engagable with the stationary sub-mould to form a mould cavity therebetween for molding an article, wherein the movable sub-mould comprise a mould base, a core fixed with the mould base and a pushing means for pushing the article off the movable sub-mould, the pushing means comprising an annular slot formed in the mould base and a pushing ring received in the annular slot, and wherein the pushing ring and the mould base are positioned corresponding to a peripheral portion of the mould cavity.

2. The molding device as claimed in claim 1, wherein the surface of the mould base facing the mould cavity has rough textures for forming foggy textures on a corresponding surface of a peripheral portion of the molded article.

3. A molding device comprising a first sub-mould and a second sub-mould engagable with the first sub-mould to form a mould cavity therebetween for molding an article, wherein the first and second sub-moulds both have a mould base and a core respectively, the mould base and the core of one of the first and second sub-moulds retaining the molded article therein after separation from the other of the first and second sub-moulds are integrally fixed with each other, and said one of the first and second sub-moulds further comprises a pushing means for pushing the molded article therefrom, the pushing means comprising an annular slot formed in the mould base of said one of the first and second sub-moulds and a pushing ring received in the annular slot, and wherein the pushing ring and the mould bases of the first and second sub-moulds are positioned corresponding to a peripheral portion of the mould cavity.

4. The molding device as claimed in claim 3, wherein the surface of the mould base of each sub-mould facing the mould cavity has rough textures for forming foggy textures on a corresponding surface of a peripheral portion of the molded article.

5. A molding device comprising a first sub-mould and a second sub-mould engagable with the first sub-mould to form a mould cavity therebetween for molding an article, wherein one of the first and second sub-moulds retaining the molded article therein after separation from the other of the first and second sub-moulds comprises a mould base, a core and a pushing means for pushing the molded article therefrom, the mould base and the core being integrally formed with each other, the pushing means comprising an annular slot formed in the mould base and a pushing ring received in the annular slot, and wherein the pushing ring and the mould base are positioned corresponding to a peripheral portion of the mould cavity.

* * * * *